US010554148B2

(12) United States Patent
Brueckner et al.

(10) Patent No.: US 10,554,148 B2
(45) Date of Patent: Feb. 4, 2020

(54) DEVICE AND METHOD FOR PREMAGNETIZATION OF A POWER TRANSFORMER IN A CONVERTER SYSTEM

(71) Applicant: GE Energy Power Conversion Technology Limited, Rugby, Warwickshire (GB)

(72) Inventors: Thomas Brueckner, Berlin (DE); Michael Bernhard Kocur, Berlin (DE); Peter Nadolny, Berlin (DE)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 0 days.

(21) Appl. No.: 16/196,759

(22) Filed: Nov. 20, 2018

(65) Prior Publication Data

US 2019/0157982 A1    May 23, 2019

(30) Foreign Application Priority Data

Nov. 20, 2017   (DE) .................... 10 2017 127 311

(51) Int. Cl.
*H02M 1/32*       (2007.01)
*H02M 1/36*       (2007.01)
(Continued)

(52) U.S. Cl.
CPC ............ *H02M 7/125* (2013.01); *H02H 1/043* (2013.01); *H02H 9/002* (2013.01); *H02M 1/36* (2013.01);
(Continued)

(58) Field of Classification Search
CPC .......... H02M 1/32; H02M 1/36; H02M 7/125; H02H 1/043; H02H 1/046; H02H 9/002; H02J 3/38; H02J 3/46
(Continued)

(56) References Cited

U.S. PATENT DOCUMENTS 5,216,586 A * 6/1993 Saito ........................ G05F 1/59
                                                      323/901
5,483,142 A * 1/1996 Skibinski ............... H02H 9/001
                                                      320/166

(Continued)

FOREIGN PATENT DOCUMENTS

DE    102012104005 A1    5/2012
EP         3010104 A1   10/2014
WO     2015189437 A1   12/2015

OTHER PUBLICATIONS

German Office Action dated Nov. 20, 2017 which was issued in connection with DE 102017127311.5 which was filed on Nov. 20, 2017.

(Continued)

*Primary Examiner* — Nguyen Tran
*Assistant Examiner* — David A. Singh
(74) *Attorney, Agent, or Firm* — Wood IP LLC (57) ABSTRACT

Provided is a premagnetization device for a converter system that is connectable to a three-phase electrical grid that has a three-phase power transformer, a converter connected to the power transformer and a circuit-breaker on the grid side of the power transformer. The premagnetization device is premagnetizes the power transformer in a state isolated from the grid. The premagnetization device uses a single-phase reference voltage (Uref) that has a fixed relationship to the grid voltage (Ugrid) with regard to the voltage parameters, in order to generate, based on the measured instantaneous reference voltage (Uref) and the known fixed
(Continued)

parameter relationships, by actuating the converter, a three-phase alternating voltage synchronous to the grid voltage (Ugrid) on the grid side of the power transformer.

14 Claims, 4 Drawing Sheets

(51) Int. Cl.
*H02M 7/12* (2006.01)
*H02J 3/38* (2006.01)
*H02H 1/04* (2006.01)
*H02H 9/00* (2006.01)

(52) U.S. Cl.
CPC ............... *H02H 1/046* (2013.01); *H02J 3/38* (2013.01); *H02M 1/32* (2013.01)

(58) Field of Classification Search
USPC .................................. 307/19, 58, 59, 82, 83
See application file for complete search history.

(56) References Cited

U.S. PATENT DOCUMENTS

| | | | |
|---|---|---|---|
| 6,055,163 A * | 4/2000 | Wagner | H02J 3/38 323/241 |
| 7,092,262 B2 | 8/2006 | Ryan et al. | |
| 7,965,529 B2 | 6/2011 | Gibbs et al. | |
| 9,337,762 B1 | 5/2016 | Gibbs et al. | |
| 2001/0048290 A1 * | 12/2001 | Underwood | H02J 3/38 322/20 |
| 2004/0246085 A1 * | 12/2004 | West | H02J 9/005 336/96 |
| 2009/0147549 A1 * | 6/2009 | Jones | H02M 5/4585 363/37 |
| 2011/0133552 A1 * | 6/2011 | Binder | H02J 3/383 307/22 |
| 2016/0126858 A1 | 5/2016 | Wu et al. | |
| 2017/0222429 A1 * | 8/2017 | Turner | H02H 9/002 |
| 2018/0069404 A1 * | 3/2018 | Schult | H02M 5/4585 |
| 2018/0254628 A1 * | 9/2018 | Schelenz | H02J 3/18 |
| 2018/0331569 A1 * | 11/2018 | Pecorari | H02J 9/062 |

OTHER PUBLICATIONS

Wikipedia: Switching on of a transformer.
Ekstrom et al: Transformer Magnetizing Inrush Currents Using a Directly Coupled Voltage-Source Inverter.
Wikipedia: Synchronoscope.
Evanczuk: Synchronizing Small-Scale PV Systems with the Grid.
Wikipedia: Measuring transformer.
Wikipedia: Voltage transformer (energy technology).
Firmenschrift ABB, SYNCHROTACT 5, Synchronizing and Paralleling Equipment and Systems for Synchronous Machines and Networks, 2010.
Wikipedia: Measurement error.

* cited by examiner

DEVICE AND METHOD FOR PREMAGNETIZATION OF A POWER TRANSFORMER IN A CONVERTER SYSTEM

BACKGROUND OF THE DISCLOSURE

This invention relates generally to converter systems, and more particularly to a device and method for premagnetization of a power transformer in a converter system.

Converter systems are often used to connect remote power plants, e.g. wind turbines and photovoltaic (PV) systems, with an electrical supply or distribution grid, e.g. a medium-voltage (MV) grid, or to supply drive devices, e.g. motors, pumps, compressors, etc., from the MV grid. Nowadays, self-commutated voltage-controlled converters (so-called voltage source converters, VSC) with DC voltage intermediate circuits are generally used for these applications. These converters are electrically connected to the MV grid via a power transformer, also referred to as a main transformer or converter transformer, which converts the voltage of the MV grid, usually 1-50 kV, typically 10-30 kV, into a suitable alternating voltage (AC voltage) which, on the AC side of the converter, depending on the application, can be between e.g. 400 V and 3,300 V. A circuit-breaker is arranged on the primary side (grid side) and/or the secondary side (converter side) of the power transformer to connect the converter system as necessary to the grid or isolate it from the grid galvanically.

In applications for renewable energy systems, the main circuit-breaker of the converter system is preferably arranged on the grid side of the transformer. This makes it possible to isolate the power transformer from the grid when it is not in use, e.g. at night time in PV converter systems or in windless conditions in wind turbines, which can result in significant loss and cost savings.

In order to connect the converter to the grid, i.e. to close the circuit-breaker, it is necessary to precharge the DC voltage intermediate circuit of the converter. Otherwise, the discharged DC voltage intermediate circuit would act as a transient short-circuit and high transient short-circuit currents would flow through the power transformer, converter free-wheeling diodes and DC voltage intermediate circuit capacitors. The DC voltage intermediate circuit capacitors would be charged with a large voltage spike, which could destroy these and other converter components. Therefore, a precharging device for converters is generally used in order to precharge the DC intermediate circuit approximately to its rated operating voltage before the circuit-breaker is closed.

If the circuit-breaker is positioned between the grid and the power transformer and the power transformer is not magnetized, closing the circuit-breaker could result in a greatly increased inrush current or inrush currents, in the event of an adverse phase relationship. The magnitude of this inrush current depends on the turn-on time in relation to the timing of the mains voltage and the magnetic flux stored in the transformer core. The strength of the inrush current can, in individual cases, trip fuses or open isolators or circuit-breakers. The power system would have to be sized to withstand the transient inrush currents. However, a repetitive high transformer inrush current can reduce the service life of the circuit-breaker. For this reason, precharging devices for converters are often extended with the function of a premagnetization of the power transformer.

From practice, different devices for precharging the DC voltage intermediate circuit of a converter and for premagnetization of a power transformer are known. Generally, in remote converter systems, no auxiliary power supply by a separate (low-voltage) grid is provided. The entire power requirement for the control and auxiliary equipment, e.g. cooling, heating and lighting subsystems, must then be obtained from the MV grid. This also applies e.g. to PV converters, which can be used at times when no solar power is available for power supply conditioning, e.g. reactive power compensation, as well as for the auxiliary power supply required for the purpose of heating, monitoring, etc., independent of the availability of the solar power. Therefore, an auxiliary power supply is generally provided via an auxiliary transformer from the MV power supply. This auxiliary power supply can also be used to precharge the DC voltage intermediate circuit of a converter.

For example, in a known device, a special three-phase precharging transformer is connected to an auxiliary power supply, the secondary winding of which supplies an uncontrolled three-phase rectifier bridge. The DC side of the rectifier bridge is connected to the DC intermediate circuit of the converter. The rated power of the precharging transformer is selected to be very low, so that on switching on, the transformer impedance limits the precharging current for the DC voltage intermediate circuit, which allows a slow precharging of the DC voltage intermediate circuit capacitor. It is also known to route the connection between the precharging transformer and the DC voltage intermediate circuit via two or more parallel paths of different resistances to controllably limit the precharging current for the precharging procedure.

Once the DC voltage intermediate circuit has been precharged to approximately the rated operating voltage, the converter can be operated by actuating its power semiconductor switches to generate an AC voltage on its AC side, so that the three-phase primary voltage on the grid side of the power transformer, in terms of amplitude, phase and phase sequence to the three-phase grid voltage, is largely synchronized before the circuit-breaker is closed. The respective reference quantities of the voltage amplitude, phase angle and rotation direction of the MV grid are generally measured directly on the three-phase MV grid voltage.

Such a precharge and premagnetization device is relatively complex and expensive in terms of the circuit implementation, the components required, the measurement of the parameters, and the control of the device. There is always a desire to reduce the efforts and costs.

U.S. Pat. No. 9,337,762 B1 describes a premagnetization transformer for a power transformer having a three-phase auxiliary transformer whose primary windings are connected to the three-phase AC grid voltage, and whose secondary windings are coupled to the secondary windings of the power transformer to premagnetize the latter such that a flux and a voltage of its primary windings are in phase with the grid AC voltage. This solution is complicated and costly, in part because of the use of the three-phase auxiliary transformer.

US 2016/0126858 A1 describes a precharging and premagnetization device for a converter system that can be connected to an MV grid, wherein the precharging occurs by means of a separate DC precharging power source. Once the DC voltage intermediate circuit has been precharged to the rated voltage, the converter is suitably controlled in order to modulate, on its AC side, an AC voltage synchronous with the amplitude and phase of the grid voltage. As a result, inrush currents that flow through the chokes and capacitors of an input filter of the converter can be limited when the converter is switched onto the MV grid. The reference quantities for the amplitude and phase of the grid voltage required for the premagnetization are measured directly on the grid voltage side. The effort is relatively high.

U.S. Pat. No. 7,092,262 B2 describes a precharging circuit for a DC intermediate circuit of a three-phase converter connected to a three-phase grid via a power transformer. The precharging circuit uses a single-phase isolating transformer whose input terminals are connected to a single phase of the AC grid voltage and a full-wave rectifier that connects the output of the transformer to the DC voltage intermediate circuit. A premagnetization of a power transformer is not provided.

Known premagnetization devices require measuring equipment on the MV grid side and/or a three-phase auxiliary transformer to derive the reference quantities to synchronize the voltage when magnetizing the power transformer. This leads to a relatively high level of circuitry-related and procedural effort and relatively high costs for the implementation and operation of such converter systems.

BRIEF SUMMARY

Based on this, an object of the invention is to provide a device and a method for the premagnetization of a power transformer in a converter system that allow the premagnetization to be performed with simple means, reduced circuitry-related effort and reduced procedural effort.

Another object of the invention is to provide such a device and such a method, which are preferably also suitable for the simple precharging of a DC voltage intermediate circuit of the converter system.

Yet another object of the invention is to provide a converter system having such a premagnetization device and preferably a precharging device.

These objects are achieved by a premagnetization device, a converter system, and a method of premagnetizing a three-phase power transformer, as disclosed herein.

According to one aspect of the invention, a premagnetization device for a converter system is provided that can be connected to a three-phase electrical grid and comprising a three-phase power transformer having a primary side that can be connected to the grid and a secondary side, and a converter that can be connected to the secondary side of the power transformer. The premagnetization device is set up in order to premagnetize the power transformer via the converter when the primary side of the power transformer is isolated from the grid, such that a voltage on the primary side of the power transformer is substantially synchronous with a grid voltage of the grid. The premagnetization device for this purpose has a connection to a single-phase reference voltage, which is in a fixed relationship to the grid voltage in terms of frequency, amplitude and phase, and means for detecting the reference voltage, wherein the premagnetization device is adapted to the power transformer via the converter based on the instantaneous detected reference voltage and the known relationships between the reference voltage and the grid voltage.

The premagnetization device makes it possible, in advance of a connection of the converter system to the grid, to perform a premagnetization of the power transformer by applying a voltage to the secondary side of the power transformer and actuating the converter to provide a magnetization current, so that in a grid-side primary winding of the power transformer a primary voltage is generated that is synchronized with the grid voltage in terms of frequency, amplitude, phase and phase sequence. In this case, the premagnetization device uses a reference voltage that is firmly linked to the grid voltage with regard to these reference quantities, in particular the frequency, amplitude and phase. For example, the reference voltage may be a voltage derived from the grid voltage, e.g. the voltage of a single-phase auxiliary voltage supply derived from the three-phase MV grid, e.g. LV supply. The single-phase auxiliary voltage supply may be an external source dependent on the grid, or the reference voltage may be obtained e.g. directly from the grid voltage via a single-phase auxiliary transformer. Compared to conventional devices that use a grid-powered three-phase auxiliary power supply and a three-phase auxiliary transformer for the premagnetization, the cost of the circuit implementation and the operation of the premagnetization device is significantly reduced, which also reduces the acquisition and operating costs. It has been found that the provided single-phase reference voltage source or auxiliary power supply is sufficient to also supply auxiliary units of the converter system, including controls, cooling, heating, lighting equipment and the like. A three-phase auxiliary power supply is not required for this purpose.

In some embodiments, the premagnetization device comprises a single-phase auxiliary transformer having a primary winding for electrical connection to a single-phase auxiliary voltage supply, preferably a phase voltage or a chained voltage of the grid. The detection means comprise a measuring means for detecting the voltage on a secondary winding of the auxiliary transformer as a reference for premagnetization of the power transformer. Small single-phase auxiliary MV transformers are significantly more cost-efficient than their three-phase equivalents and are also available at lower power levels that are completely sufficient to meet the typical auxiliary power requirements, including the provision of precharging and/or premagnetization power.

The invention thus enables the functionality of premagnetizing a power transformer of a converter system without the need for a three-phase auxiliary power connection and with reduced effort and simpler means compared to conventional devices. High inrush current peaks can effectively be avoided. In general, it can be assumed that the power transformer is sufficiently premagnetized and the inrush currents are sufficiently minimized when the relative error between the achieved parameters of the primary voltage of the power transformer and that of the grid voltage is less than around 10% or more, and preferably less than around 5%, in relation to the grid voltage.

Any premagnetization device as mentioned above preferably has logic for controlling the premagnetization procedure, e.g. from a DC voltage intermediate circuit of the converter, by actuating controllable power semiconductor switches of the converter using the single-phase reference voltage. The control logic can advantageously, but not necessarily, be integrated or is able to be integrated together in a control device of the converter system. In particular, the control logic may be implemented solely in software. Such a premagnetization device can also easily be retrofitted in existing systems.

In some embodiments of the premagnetization device, the control logic comprises logic means for determining premagnetization-relevant information on relationships between the grid voltage and single-phase reference voltage parameters, whereby this information is obtained in a measurement routine, preferably during the startup of the converter system or in a test cycle. The premagnetization device then further comprises storage means for storing this relevant information for use in subsequent operational premagnetization procedures in subsequent power-up processes of the converter system.

In particular, the prestored data in the storage means means may contain the determined relevant information characterizing the fixed relationships between the amplitudes and phase angles of the single-phase reference voltage and the three-phase grid voltage and the phase sequence (the rotation direction) of the three-phase system of the grid. Further, this prestored data may include measured or predetermined data enabling the power transformer to calculate or estimate the resulting primary voltage when calculating the premagnetization procedure, e.g. a turns ratio between the primary and secondary windings of the power transformer, a measured amplitude ratio, and/or a measured phase shift between the primary and secondary voltage of the power transformer when the primary winding of the auxiliary transformer is idle, etc. Not all of the data listed here is required and needs to be stored in advance. In addition, the turns ratio and/or measured amplitude and phase relationships of the auxiliary transformer can be stored in advance and used to estimate the grid voltage. A measurement of the amplitude ratio generally allows a more accurate estimate of the three-phase AC voltage of the power transformer. In any case, a control logic for the premagnetization procedure may be arranged to calculate actual values of the grid voltage and the primary voltage of the power transformer during a premagnetization procedure based on the stored relevant information or the measured or predetermined data. The stored data provides all of the quantitative information required to synchronize the primary voltage of the power transformer with the grid voltage in the future.

The only quantities that are needed later during the operational premagnetization routine are the amplitude and phase angle of the reference voltage, e.g. a voltage of the auxiliary power supply or the auxiliary voltage on the secondary winding of the auxiliary transformer, that is used as a reference for the modulation of the AC output voltage of the converter. In addition, the premagnetization device may preferably further include a measuring means for detecting the secondary voltage of the power transformer that may be used in determining the primary voltage of the power transformer in the premagnetization procedure. However, the premagnetization device is preferably free of measuring means for detecting electrical voltages or currents on the grid side of the auxiliary transformer, the grid side of the power transformer and the grid side of the circuit-breaker. No measurement of the grid voltage is performed. This further reduces the measurement effort for the premagnetization procedure and thus the implementation and operating costs.

In a some embodiments, the premagnetization device is part of a precharging and premagnetization device that is set up both to premagnetize the power transformer and to precharge the DC intermediate circuit of the converter with the converter system isolated from the grid. The precharging and premagnetization device preferably further comprises logic means for performing and controlling a precharging procedure prior to performing the premagnetization procedure. The DC voltage intermediate circuit can be precharged to approximately its rated operating voltage to avoid transient short-circuit currents when the converter is connected to the grid and associated dangers of damage to the converter components.

In advantageous embodiments, the precharging and premagnetization device may advantageously comprise a grid-connected single-phase auxiliary transformer which provides the reference voltage for the premagnetization procedure and further power for precharging the DC voltage intermediate circuit of the converter. The precharging and premagnetization device may further comprise a precharging branch connecting the auxiliary transformer to the DC voltage intermediate circuit and including a rectifier means inserted therein, preferably an uncontrolled two-pole bridge rectifier circuit, to convert the auxiliary voltage at the secondary output of the auxiliary transformer to a DC voltage for the DC voltage intermediate circuit. In a simple implementation, the converter device can be formed from an uncontrolled two-pole bridge rectifier circuit (so-called B2 bridge). Other, also controlled rectifier circuits can be used if desired.

In the precharging branch, other components, e.g. a precharging transformer, may be arranged that can be inserted between the reference voltage source or the auxiliary transformer and the rectifier circuit to switch the reference voltage to a suitable higher level to operate the converter, in particular for precharging the DC voltage intermediate circuit and for premagnetizing the power transformer. For example, the secondary voltage of the auxiliary transformer can be transformed from around 230 VAC to e.g. 1,000 VAC for a 1,500 V DC converter. However, this information is exemplary only for some applications and is in no way restrictive.

In a further refinement, the precharging branch can also have at least one first branch section with a precharging resistor in order to limit the magnitude of the precharging current in the precharging procedure. If a plurality of such branch sections having different resistance values and switch elements are provided, which enable an interposition of a respective branch section, the precharging resistor can be suitably adapted during the precharging procedure, and in particular selected to be relatively high at the start of the precharging procedure and subsequently reduced stepwise. Advantageously, a bypass branch parallel to the at least one first branch section, that is free of resistors, as well as switch elements can also be provided in order to optionally also supply current via the bypass branch without precharging resistance. This allows a lower-cost, lower-impedance precharging transformer to be used and the fuse elements to be dimensioned smaller.

The precharging branch could also be connected or connectable to another power source or completely omitted, e.g. if the DC voltage intermediate circuit can be precharged by a photovoltaic system via its DC voltage connections.

In a further aspect of the invention, a converter system is provided for an electrical power generation, power transmission and/or power distribution system, in particular for a photovoltaic or wind power plant. The converter system includes a three-phase power transformer having a primary side and a secondary side, an actuatable converter connected to the secondary side of the power transformer, a circuit-breaker, and a premagnetization device. The converter has a DC intermediate circuit having at least one DC intermediate capacitor. The circuit-breaker is arranged on the grid side or primary side of the power transformer and is configured to be selectively closed or opened to connect the primary side of the power transformer and the converter to an electrical grid electrically or isolate it from this grid galvanically. The premagnetization device is formed according to any of the various embodiments described above in connection with the first aspect.

In some embodiments of the converter system, the premagnetization device comprises a single-phase auxiliary transformer that is directly connected to a single phase of the grid and provides the reference voltage for the premagnetization procedure. The auxiliary transformer, in particular a step-down transformer, can be connected between two phase connections of the grid voltage or between a phase connection and (if present) a neutral connection on the grid side. Thus e.g. a low voltage (LV) for the auxiliary power supply can be obtained directly from the medium voltage (MV) of the grid. This can then also be used for the supply of auxiliary loads of the converter system, e.g. for cooling, heating, lighting, etc.

If a plurality of such converter systems are connected in parallel to the grid at one location, then the auxiliary transformers of the individual converter systems can preferably be connected to different phases of the supply grid in order to divide the drawn auxiliary power as uniformly as possible over the phases of the grid and prevent excessive asymmetrical loading of the grid.

Incidentally, the premagnetization device of the converter system may adopt any of the embodiments described above. To prevent repetitions, reference is made to the above description in relation to the premagnetization device according to the first aspect, whereby the associated advantages, in particular the reduction of the complexity of the implementation and the effort in operation and the associated cost savings, also benefit the converter system as a whole.

In yet another aspect, a power generation plant, in particular a photovoltaic (PV) plant or wind turbine, is provided with a converter system as described above. In these applications, the possibility of premagnetization and, if necessary, the precharging, are of particular benefit, because thereby the converter system regularly, e.g. at night or in the absence of wind, can be isolated from the grid and then connected to it again, without experiencing impairments or damage. With regard to possible refinements and achievable advantages, reference is made to the above description in connection with the premagnetization device.

In yet another aspect, a method is provided for premagnetizing a three-phase power transformer of a converter system having a voltage-controlled converter that can be connected to an electrical grid via the power transformer. The method includes providing a single-phase reference voltage that is in a fixed relationship to the grid voltage in terms of frequency, amplitude, and phase. The method further comprises determining the reference quantities for the required primary voltage of the power transformer as a function of the reference voltage in a measurement routine, preferably during the startup of the converter system, and storing the determined electrical reference quantities in a storage. The method further comprises, in subsequent start or switch-on processes, premagnetization of the power transformer with a primary side isolated from the grid of the power transformer using the instantaneous measured reference voltage and the stored electrical reference quantities by actuating the converter.

In the measurement routine, e.g. a startup routine, all of the significant relevant information concerning the relationships between the grid voltage and the auxiliary voltage are collected and saved and then used in an operational premagnetization routine each time the converter system is to be connected to the grid to synchronize the secondary voltage of the power transformer with regard to the amplitude, the phase relationship and the phase sequence.

The method preferably further comprises precharging the DC voltage intermediate circuit, e.g. from an auxiliary power supply, using the auxiliary transformer before performing each premagnetization, if necessary. The reference voltage of an auxiliary power supply or, on the secondary side, of a single-phase auxiliary transformer connected to the grid can advantageously be used for the precharging.

Still further, upon completion of precharging and premagnetization, the method preferably includes closing a circuit-breaker inserted between the grid and the power transformer to connect the power transformer to the grid voltage.

In some embodiments of the method, the measurement routine is performed in startup cycles or other test cycles under essentially the same load conditions (for the auxiliary transformer or the auxiliary voltage supply) as the operational precharging and/or premagnetization procedure. Preferably, only a small load is connected to the auxiliary voltage supply or the auxiliary transformer. The method may provide that high auxiliary loads, e.g. heaters, bellows and similar devices, are respectively disabled or switched off before performing the measuring, precharging and premagnetization routine, e.g. to prevent a phase shift and a drop in the auxiliary supply voltage or the auxiliary voltage on the auxiliary transformer. A voltage drop on the auxiliary supply voltage that is still caused by connected working loads can, if necessary, be calculated and taken into account in the measurement, precharging and/or premagnetization procedure.

BRIEF DESCRIPTION OF THE DRAWINGS

Further details of advantageous embodiments of the invention will become apparent from the drawing, the description and the dependent claims. In the drawing, for illustrative purposes only, embodiments of the invention are illustrated which in no way limit it. The drawings in detail:

DETAILED DESCRIPTION

Figure 1:
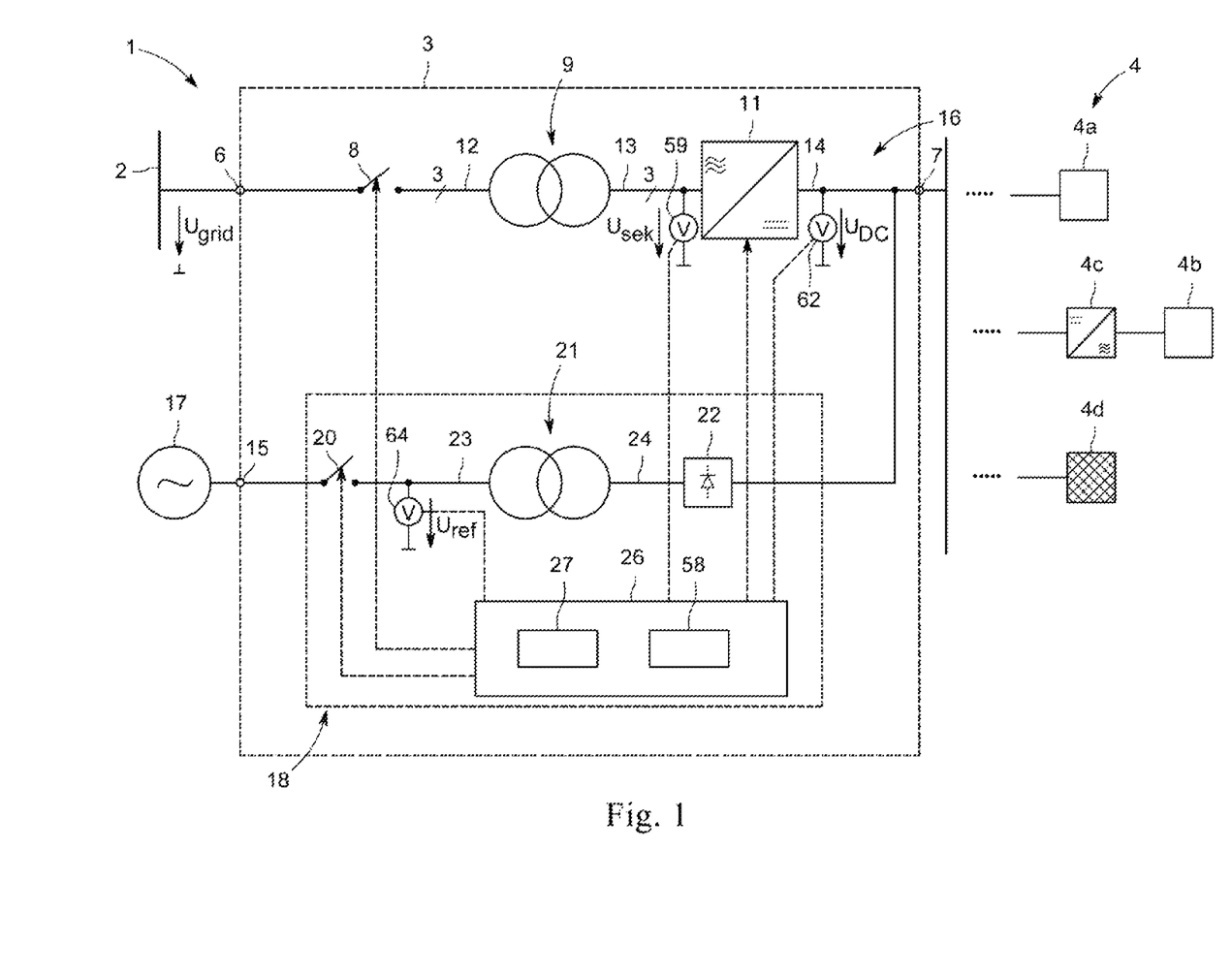
FIG. 1 is a block diagram of a grid-connected converter system according to an embodiment of the invention, in a greatly simplified schematic representation.

FIG. 1 illustrates, in a highly simplified schematic representation, a block diagram of a system 1 that can be used for power generation, power distribution or power transmission. In the example shown, the system 1 has a converter system 3 connected to a grid 2, in particular a medium-voltage (MV) power supply grid, that is e.g. set up to take AC power from the grid 2 and convert it into DC power, which can then be used to supply a device 4 with power. The grid 2 is here a three-phase grid that supplies a three-phase voltage $U_{grid}$. The device 4 may be a direct current (DC) load 4a, e.g. a DC motor, a battery for storing the power, or any suitable DC load. The device 4 may also be an AC voltage (AC) load 4b, that is supplied via an upstream inverter 4c. Optionally, additional required devices to suitably condition the power supplied by the converter system 3 for use by the loads 4a, 4b are omitted from FIG. 1 for clarity.

The converter system 3 can also be designed as an inverter system or bidirectionally in order to convert DC power from the device 4 into an AC power suitable for supplying to the grid 2 and to supply it to the grid 2. In this case, the device 4 may e.g. be a regenerative power generation plant, e.g. a photovoltaic (PV) plant, a wind turbine connected via a rectifier (not shown), a fuel cell-based plant, etc., or another grid that can deliver power.

The converter system 3 has, between its AC voltage (AC) terminal 6 and its DC voltage (DC) terminal 7 in a series arrangement, a power circuit-breaker 8, a main transformer or power transformer 9 and a converter 11. The AC terminal 6 is electrically connected to the grid 2. The circuit-breaker 8 is arranged between the AC terminal 6 and the power transformer 9 and configured to be selectively closed or opened to selectively make or break an electrical connection between the grid 2 and the power transformer 9 and the converter 11. When the circuit-breaker 8 is opened, the power transformer 9 and the converter 11 are galvanically isolated from the grid 2.

The power transformer 9 is a three-phase transformer that converts the three-phase AC voltage of the grid 2, in particular a medium-voltage (MV) grid in the range of around 1-50 kVAC, generally 10-30 kVAC, into an AC voltage in the range of 230-3,300 VAC that is suitable for the converter 11. The power transformer 9 has, in a known manner, a primary side or primary winding 12 on the grid side and a secondary side or secondary winding 13 on its converter side.

The converter 11 is configured to rectify the three-phase transformed AC voltage on the secondary side 13 of the power transformer 9 and to provide it on its direct current (DC) side 14 and/or conversely to invert the DC voltage. The converter 11 is here a voltage-controlled converter with a DC voltage intermediate circuit (so-called voltage source converter, VSC) and may be a two-stage or multistage converter, comprising a number of actuatable power semiconductor switches, especially IGBTs, MOSFETs, IGCTs, GTOs, etc. that are suitably connected and can be clocked at high frequency in order to achieve rectification or inversion. The DC side 14 of the converter 11 forms a DC intermediate circuit here only indicated by the reference numeral 16, which serves as a power storage to electrically couple the converter system 3 with the downstream device 4. The DC voltage intermediate circuit 16 may, in particular, have a DC intermediate capacitor, not illustrated here in detail, that may be formed from one or more capacitors or a capacitor bank.

As further shown in FIG. 1, the converter system 3 is additionally connected here via a terminal 15 to an auxiliary power supply 17, that may be a low-voltage (LV) voltage source which supplies a single-phase auxiliary supply voltage $U_{aux}$ derived from the MV grid 2, that is used to supply auxiliary devices, not shown here, e.g. that can be used for cooling, heating or lighting in the converter system 3 or for control. Although the auxiliary voltage supply 17 is shown here as an external voltage source, it can also be generated internally within the converter system 3 from the grid voltage $U_{grid}$.

In addition, a precharging and premagnetization device 18 is provided in the converter system 3 and adapted to precharge the DC intermediate circuit 16 when the converter system 3 is isolated from the grid 2, if necessary to an operational level, and to synchronously premagnetize the power transformer 9 to the grid voltage when the circuit-breaker 8 is opened, i.e. the primary winding 12 of the power transformer 9 separated from the grid 2. For this purpose, the precharging and premagnetization device 18 has a precharging branch 19 connected between the auxiliary power supply 17 and the DC voltage intermediate circuit 16, in which a switch 20, a transformer 21 and a rectifier device 22 are arranged.

The transformer 21 is connected on its primary side and primary winding 23 via the controllable switch 20 with the auxiliary power supply 17, while its secondary side and secondary winding 24 are connected to the rectifier device 22. The transformer 21 converts the voltage supplied by the auxiliary power supply 17 to a suitable level, e.g. for the supply of auxiliary devices (not shown here) and, in particular, for precharging the DC voltage intermediate circuit 16. Due to this functionality, the transformer 21 may also be referred to as a precharging transformer.

For the premagnetization function, it is important that the auxiliary power supply 17 be in a defined relationship to the grid voltage, e.g. a grid voltage downconverted to the low voltage range, so as to maintain fixed relationships between the amplitude and phase of the voltage of the auxiliary power supply 17 and the grid voltage. The auxiliary power supply 17 may, in particular, be derived directly from the grid voltage or be formed from a grid voltage or phase-element voltage of it, as is also the case in the embodiment of FIG. 2 described in more detail below.

With further reference to FIG. 1, it can be seen that the rectifier device 22 is arranged between the precharging transformer 21 and the DC intermediate circuit 16 in order to rectify the AC voltage on the secondary winding 24 and to supply it to the DC intermediate circuit 16. The rectifier device 22 may be formed in the simplest case from an uncontrolled rectifier bridge (so-called B2 bridge or Graetz bridge), that is known to be formed from four interconnected diodes that provide a slightly pulsating DC voltage. Other, also controlled rectifier circuits can also be used here.

As further shown in FIG. 1, a controller 26 is provided to monitor and control the converter system 3. In particular, the controller 26 is adapted to actuate the circuit-breaker 8 and the switch 20 in the precharging branch 19 to close or open them, and to actuate the power semiconductor switches of the converter 11 to convert the transformed grid voltage to a DC voltage or vice versa. The controller 26 further includes logic means 27 for controlling the precharging and premagnetization procedures. Details of the logic means 27 and the other components of the system 1 of FIG. 1 are further explained in connection with FIG. 2 below.

Figure 2:
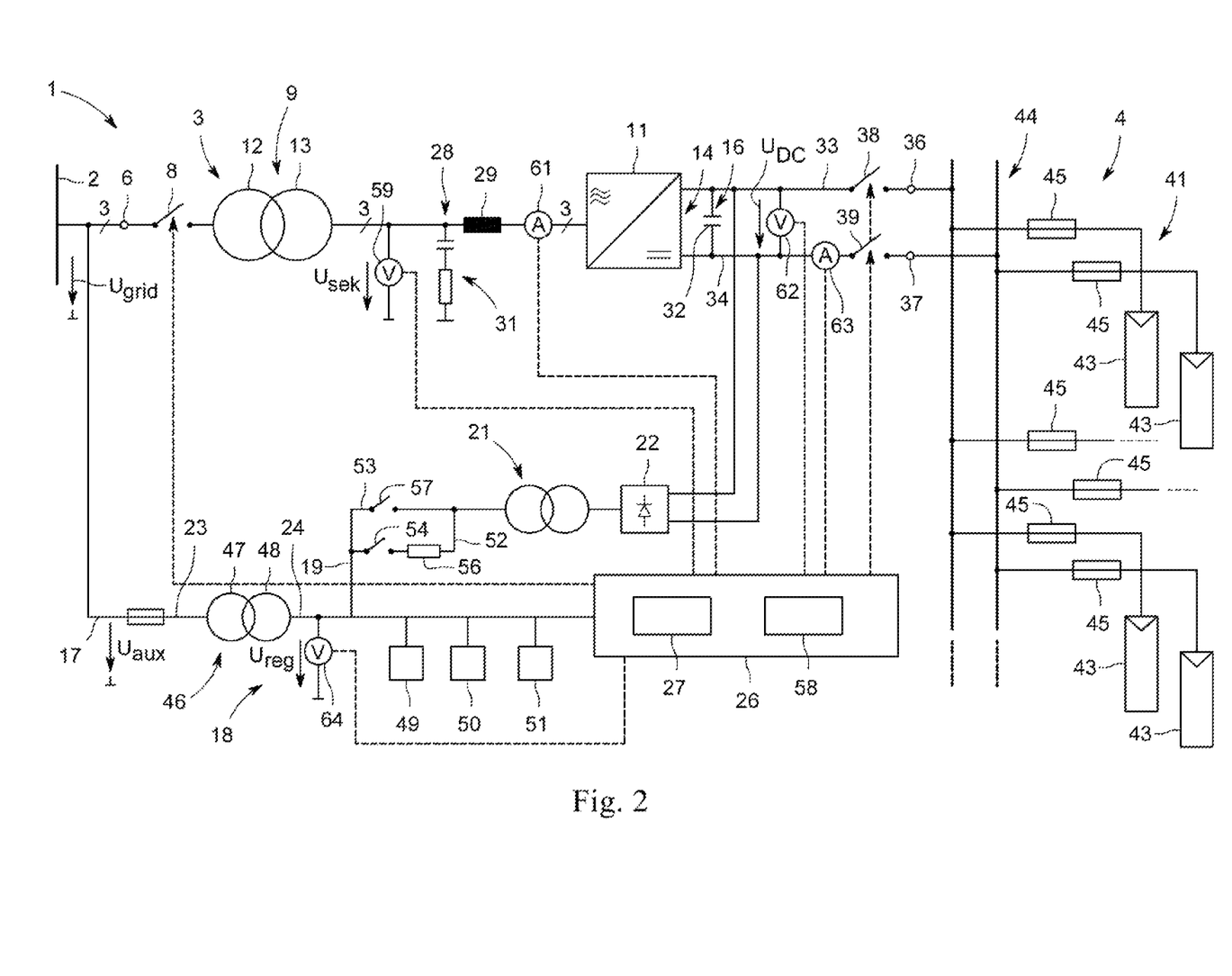
FIG. 2 shows a power generation plant with the converter system according to FIG. 1 in a modified embodiment compared to FIG. 1, in a more detailed circuit diagram representation.

FIG. 2 shows a purely exemplary application of the converter system 3 of FIG. 1 for a power generation plant, in particular a photovoltaic system, in a more detailed representation than FIG. 1, illustrating additional components of the converter system 3 and in a slightly modified embodiment. Insofar as the system 1 according to FIG. 2 corresponds to that of FIG. 1 in its construction and/or function, reference is made to the above description based on the same reference numerals for the same components.

The system 1 according to FIG. 2 has the converter system 3 that can be connected to the grid 2, in particular a three-phase MV grid, with the circuit-breaker 8, the power transformer 9 and the converter 11. The circuit-breaker 8 is connected on the grid side, on the primary side 12 of the power transformer 9, to allow as necessary, e.g. at night, when no solar power is available, the isolation from the grid of the entire converter system 3, including the power transformer 9. Advantageously, power transformer losses can then be prevented.

The power transformer 9 connected between the circuit-breaker 8 and the converter 11 downconverts the three-phase power voltage of the MV grid from the MV range, generally 10-30 kVAC, for the example of a PV plant, generally to an LV range, e.g. 400-690 VAC to make it compatible with the design of the converter 11. Between the power transformer 9 and the converter 11, customary power filters and EMC filters 28 are here arranged that serve to reduce high-frequency noise and harmonics. The power filters and EMC filters 28 are shown here only symbolically by a power choke 29 in the conduction path between the power transformer 9 and the converter 11, and an RC series circuit 31 of a resistor and a capacitor connected between the conduction path and a local ground. It must be noted that the conduction path between the grid 2 and the converter 11 is a three-phase path throughout.

The converter 11 is, as mentioned above, an electronic converter comprising high-frequency clocked power semiconductor switches, e.g. IGBTs, in a circuit which makes it possible to convert the DC voltage $U_{DC}$ of the DC intermediate circuit 16 into a three-phase alternating voltage and a three-phase alternating current that are suitable for supplying to the grid 2. The DC intermediate circuit 16 is represented by a DC intermediate circuit capacitor 32 that is connected between a first and a second DC voltage (DC) line 33, 34 on the DC side 14 of the converter 11. The DC intermediate capacitor 32 can also be formed from a capacitor bank with a series and/or parallel connection of a plurality of capacitors, in order to enable a higher power storage capacity.

The first and second DC lines 33, 34 extend to a first and second DC terminal 36, 37 of the converter system 3 respectively, and each includes a DC isolator 38 and 39 respectively, that allows the converter 11 to be separated as necessary from the device 5 connected to the converter system 3, here in particular the PV system 41. It is also possible to use a multipole switch with a pole 38, 39 for each DC line 33, 34. In any case, a galvanic separation of the converter system 3 from the PV system 41 can be useful in particular at night or at other times, in which the supplied solar power is not sufficient for supplying the grid 3, or in case of fault. It also allows certain functionalities, e.g. the operation of the converter 11 for reactive power compensation at night, without impairing the PV system 41.

The PV system 41 is formed in the usual way by a PV array 42 of a plurality of PV modules with solar cells that convert solar radiation into electrical energy. The PV modules 43 are connected to a common DC bus 44 that is connected to the DC terminals 36, 37 of the converter system 3. In the lines between the DC bus 44 and the PV modules 43, PV fuses 45 may be provided to protect against overcurrents.

In contrast to the embodiment according to FIG. 1, the auxiliary power supply 17 in FIG. 2 is not an external source, but is coupled directly to the grid 2. In particular, an auxiliary transformer 46 is connected to the MV grid 2, wherein on the primary side 47 of the auxiliary transformer 46, a fuse 47 may be arranged to protect the auxiliary transformer 46 and the devices connected to the secondary side 48 against excessive overcurrents in case of fault.

The auxiliary transformer 46 is a single-phase transformer connected to a single phase of the grid 2. It can be connected between any two phase conductors of the power grid 2 to access the line voltage. Alternatively, it can also be connected between any phase conductor and (if present) a neutral point or star point on the grid side to access the respective phase voltage. In any case, the auxiliary transformer 46 converts the MV voltage from the kV range into an AC voltage of e.g. 230 VAC. Such a voltage at the output of the auxiliary transformer 46, also referred to here as the auxiliary voltage, is suitable and sufficient for the supply of auxiliary devices of the converter system 3. By way of example only, a heater 49 that may comprise electrical heating elements, a cooling device 50, that may include bellows, etc., and an illumination device 51 are illustrated as auxiliary devices that can be powered by the auxiliary power supply 17 via the auxiliary transformer 46. In addition, the auxiliary transformer 46 preferably also supplies the controller 26 so that it can also fulfill its functions in a state when separated from the PV system 43 and from the grid 2.

The auxiliary transformer 46 is also part of the precharging and premagnetization device 18 that is connected or active between the here single-phase auxiliary power supply 17 and the DC voltage intermediate circuit 16 of the converter 11. In the precharging branch 19, the rectifier device 22, e.g. an uncontrolled B2 rectifier bridge is arranged, whose DC side bridge terminals are connected to the first and second DC line 33, 34 respectively. Between the auxiliary transformer 46 and the rectifier device 22, the optional precharging transformer 21 is arranged here, that upconverts the secondary side output voltage of the auxiliary transformer 1 into an AC voltage of e.g. 1,000 VAC suitable for operating the converter 11, to the voltage in the DC intermediate circuit 16 of e.g. 1,500 VDC. Depending on the application and circuit design, the precharging transformer 21 may also be omitted, depending on the rated voltages of the auxiliary transformer 46 and the converter 11.

In the illustrated embodiment, the precharging branch 19 further includes a first branch section 52 and a second branch section 53 parallel to it. The first branch section 52 has a series connection of a switch element 54 and a precharging resistor 56. The second branch section 53 has another switch element 57 but no additional resistor. Depending on which of the switch elements 54 and 57 is closed, either the precharging resistor 56 can be switched into the precharging and premagnetization branch 19 to limit the precharging current flowing through the branch 19, or the second branch section 53 is turned on, which then serves as a low-resistance bypass branch.

As already mentioned, the controller 26 is provided and set up for monitoring and controlling the converter system 3. In particular, the controller 26 modulates the power semiconductor switches of the converter 11 in order to enable the inversion of the voltage supplied by the PV system 41 and stored in the DC intermediate circuit 16 into a three-phase AC voltage for supplying the grid 2. The controller 26 also operates the circuit-breaker 8, the DC isolators 38, 39 and the switch elements 54, 57 and 20 respectively (FIG. 1) to open or close them selectively. The controller 26 also includes the logic means 27 for controlling a precharging and premagnetization procedure and storage means 58 for storing control routines, operating parameters and data.

The controller 26 also has a monitoring device which comprises various measuring means that detect electrical variables in the converter system 3 and supply signals characteristic of them to the controller 26. The measuring or monitoring device comprises, in particular, a voltage measuring means 59 that detects the voltages $U_{sek}$ on the secondary side 13 of the power transformer 9, and a current measuring means 61 that detects the alternating current $T_U$, $I_V$, $I_W$ in the phase lines between the power transformer 9 and the converter 11. In addition, a voltage measuring means 62 for detecting the DC voltage $U_{DC}$ across the DC voltage intermediate circuit capacitor 32 and a current measuring means 63 for detecting the DC current Inc in one of the DC lines 33, 34 are provided. In addition, a voltage measuring means 64 on the secondary side of the auxiliary transformer 46 (or in the precharging branch 19 on the primary side 23 of the precharging transformer 21 in FIG. 1) are arranged to detect there the reference voltage $U_{ref}$ that can then be used for controlling the premagnetization procedure and if necessary the precharging procedure. In contrast to conventional systems which allow such a precharging and premagnetization, however, in the inventive system 1 according to FIG. 2, voltage or current measuring means on the MV grid side are neither required nor provided.

As already mentioned, with the given positioning of the circuit-breaker 8, it is possible to isolate the power transformer 9 from the grid as necessary if the converter system 3 is not in operation. For example, during the night when the PV converter is not working, significant loss and cost savings can be achieved. Conversely, the PV converter 11 for power conditioning, e.g. for reactive power compensation, can be connected to the grid 2 even if no solar power is available. The auxiliary power drawn or derived from the MV grid 2 allows the converter 11 to operate independently of the availability of solar power. In addition, the auxiliary devices 47-49 and the controller 26 can always be sufficiently supplied even without solar power.

Before the converter system 3 can be connected to the MV grid, i.e. the circuit-breaker 8 can be closed, the DC intermediate circuit 16 of the converter 11 must be precharged approximately to the rated voltage. Otherwise, the discharged DC voltage intermediate circuit would act as a transient short-circuit that would result in a high transient short-circuit current through the power transformer, freewheeling diodes of the converter 11 and the DC intermediate capacitor 32. The latter could possibly be damaged in case of strong overvoltage during charging. Other components of the converter system 3 could also be destroyed. Therefore, a precharging device as part of the precharging and premagnetization device 18 provides, as necessary, for the DC voltage intermediate circuit 16 to be precharged approximately to its rated power before the circuit-breaker 8 is closed.

In addition, the power transformer 9 must be premagnetized before the circuit-breaker 8 is closed. Otherwise, closing the circuit-breaker 8 without premagnetization could cause large inrush currents or inrush current peaks in the primary windings of the power transformer, even if the intermediate circuit 16 was previously precharged. Although such transformer inrush currents are generally not detrimental to components of the converter system 3, they may eventually reduce the useful life of the circuit-breaker 8. Therefore, a premagnetization device as part of the precharging and premagnetization device 18 is adapted to premagnetize its primary voltage synchronously with the grid voltage of the grid 2 when the primary winding 12 of the power transformer 9 is isolated from the grid 2. Synchronous in this case means that these voltages largely coincide with the acceptable deviations with regard to the amplitude, frequency, phase relationship and phase sequence, so that no or substantially no inrush currents occur when closing the circuit-breaker 8. The permissible deviations preferably amount to a maximum of 10%, and even more preferably 5%, of the respective parameter magnitude of the grid voltage. The controller 26 with the logic means 27 contained therein is thus specially arranged to precharge the DC intermediate circuit 16 to its rated power as required before each closing of the circuit-breaker 8 and then to premagnetize the power transformer 9 in a manner synchronous with the grid voltage.

The invention is also based on the fact that, in contrast to the short-circuit currents in the DC intermediate circuit 16, a high transformer inrush current is tolerable in individual cases if this event does not occur frequently. The controller 26 therefore performs a measurement routine with a precharging without premagnetization the power transformer 9 once, preferably during a startup procedure or at another suitable test time. The DC intermediate circuit 16 is charged from the auxiliary voltage $U_{aux}$ via the auxiliary transformer 46 and one of the branch sections 52, 53 (in the embodiment of FIG. 2) and the branch 19 (in FIG. 1), the optional precharging transformer 21 and the rectifier device 22 to the rated voltage, whereupon the circuit-breaker 8 is closed. The high inrush currents are tolerated here once. Once stable conditions have been set, the controller 26 detects, by means of the voltage measuring means 59, 64 qualitative and quantitative information required to later be able, at times when the converter 11 is to be switched onto the grid 2, to synchronize the primary voltage of the power transformer 9 with the grid voltage. This information that can be measured directly or derived from measured values, comprises, in particular, the amplitude ratio and the phase angle between the single-phase auxiliary voltage of the auxiliary transformer 46 and the three-phase grid voltage as well as the phase sequence of the three-phase system of the grid 2.

In addition, the ratio between the amplitude of the voltage $U_{ref}$ at the output of the auxiliary transformer 46 and that of the primary voltage of the three-phase power transformer can also be measured, in order to allow a largely accurate estimation of the three-phase grid voltage. Alternatively, the latter may also be determined based on the known winding ratio of the auxiliary transformer 46 and considering the winding ratio of the power transformer 9.

All predetermined electrical reference quantities may be stored in the storage 58 of the controller 26 and used in future premagnetization procedures. This makes it possible to perform the premagnetization procedure without measuring the electrical voltages and currents directly on the (MV) grid side.

In a later premagnetization procedure, after the DC intermediate circuit 16 has been precharged to the required rated power as necessary, a premagnetization procedure is then performed in which a voltage and a magnetization current are generated from the DC voltage intermediate circuit voltage by pulsing of the power semiconductor switch of the converter 11 on its AC side, which premagnetizes the power transformer 9 synchronously with the grid voltage so that, during the subsequent closing of the circuit-breaker 8, no or no significant inrush currents arise. The single-phase secondary voltage of the auxiliary transformer 46 (or the auxiliary supply voltage $U_{aux}$ in the embodiment of FIG. 1) that is in a defined relationship with the grid voltage $U_{grid}$, is used for this purpose as the reference $U_{ref}$ and is sufficient as a reference quantity together with the stored information.

The load state for the auxiliary transformer 46 (or the auxiliary power supply 17) at the time of the measurement can preferably be taken into account both during the measurement routine on startup or other test procedure for determining the required electrical reference quantities and also during the subsequent premagnetization procedures. Preferably, the measurement is performed under the same load condition as the premagnetization process, i.e. at low load, e.g. with the heating, cooling and/or lighting device 49-51 switched off. If necessary, deviating load conditions in future premagnetization procedures can possibly be determined mathematically and taken into account.

Figure 3:
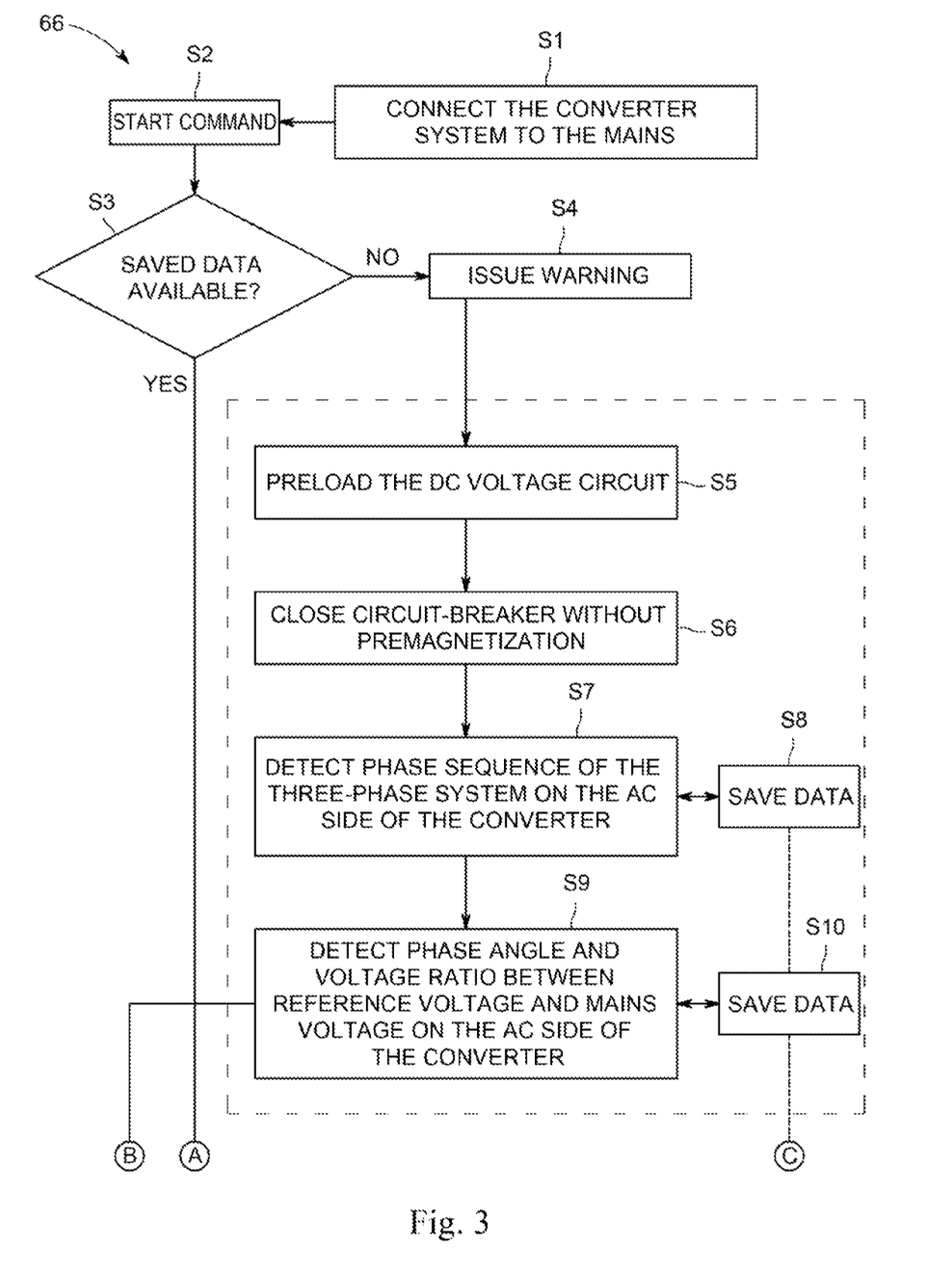
FIG. 3 shows a flow diagram of a method for precharging a DC intermediate circuit and for premagnetizing a power transformer of a converter system according to an embodiment of the invention.

FIG. 3 shows a flow chart of an exemplary precharging and premagnetization procedure according to the invention. Numerous modifications may be made to this routine within the inventive concept without departing from its scope. For example, the order in which the information is acquired and stored or the time at which the auxiliary voltage is measured on the secondary winding of the auxiliary transformer during the operational precharging and premagnetization routine can be selected arbitrarily. The order of the method steps, if executable, can also be modified.

The inventive method 66 begins with the optional step S1, in which a converter system, e.g. the converter system 3 according to FIG. 1 or 2, is wired to the grid, e.g. to the MV grid 2, if this has not already been performed previously.

Once a command to start the converter system 3 has been given (step S2), it is checked whether already stored data relevant for a premagnetization procedure is available (step S3). This relevant information comprises, in particular, the amplitude ratio and the phase angle between the reference voltage $U_{ref}$, e.g. the single-phase auxiliary voltage at the output of the external auxiliary voltage supply 17 in FIG. 1 or the auxiliary transformer 46 in FIG. 2, and the three-phase grid voltage $U_{grid}$ and the phase sequence of the three-phase system of the grid 2 and if necessary also the amplitude ratio between the reference voltage and the three-phase primary voltage of the power transformer 9.

If such data is not available (NO in step S3), a warning may be issued to the operator of the system if necessary in step S4. It is also possible to increment a counter that counts the number of all precharging events without premagnetization. This gives the operator the opportunity to detect a fault in the system and cancel the startup if necessary. The output of a warning is optional. Alternatively, the system could automatically run the subsequent startup or test routine during which the information required for the premagnetization is obtained and stored in a storage, e.g. 58.

For this purpose, in step S5 the DC intermediate circuit, e.g. 16, is first precharged to the rated operating voltage and then the circuit-breaker, e.g. 8, is closed without previous premagnetization of the power transformer, e.g. 9 (step S6).

In step S7, the controller 26 subsequently detects the rotation direction or phase sequence of the three-phase system on the AC side of the converter 11, e.g. via the measuring means 59 and stores the associated data, e.g. in the storage 58 in step S8.

Further, the controller 26 detects the phase angle and the amplitude ratio between the reference voltage $U_{ref}$ and the grid voltage on the AC side of the converter 11 in step S9, and stores the associated data in step S10.

Thereafter, the normal operation of the converter 11 can be started, as shown in step S11.

If the relevant information, i.e. the electrical reference quantities required for a premagnetization procedure, as mentioned above, is already available in the storage 58 of the controller (YES in step S3), then a normal operational precharging and premagnetization sequence is started. For this purpose, if necessary, the DC intermediate circuit, e.g. 16, of the converter, e.g. 11, is precharged to the rated operating voltage (step S12), and the voltage $U_{ref}$, e.g. the secondary voltage of the auxiliary transformer 46, is measured as a reference for determining the grid voltage amplitude and phase (step S13).

Based on this, the power transformer 9 is then suitably premagnetized by controlled pulsing of the power semiconductor switches of the converter 11 to modulate a voltage on the AC terminals of the converter 11, which, taking into account the transformation by the power transformer 9 with regard to the amplitude and phase, matches the grid voltage (step S14). For the premagnetization procedure, the data previously obtained and stored in advance during the startup or other test procedure (steps S7-S10) together with the measured reference voltage $U_{ref}$ are used to modulate the synchronous AC voltage on the primary side or grid side of the power transformer 9 (step S15).

Once the power transformer 9 is sufficiently premagnetized, i.e. its primary voltage is substantially equal, in terms of frequency, amplitude, phase relationship and phase sequence, to the calculated or estimated grid voltage, the circuit-breaker 8 is closed in step S16 and the normal operation of the converter 11 is started in step S11.

Even in the event that the relevant information is already available in the storage 58 of the controller (YES in step S3), the possibility of manual override can usefully be implemented in the routine so that, in this case too, steps S5 to S10 can be run once again in a targeted manner. This makes sense, in particular, after major service work in which relevant parameters with regard to the precharging procedure, e.g. the phase relationship between the reference voltage ($U_{ref}$) and the grid voltage ($U_{grid}$) could have been modified.

The invention permits the precharging of the DC intermediate circuit of a converter system and, in particular, the premagnetization of a power transformer of the converter system with simple, inexpensive means, with little effort, without the need for large and expensive three-phase MV auxiliary transformers. A single-phase auxiliary transformer 46 is sufficient. There is also no need to provide measuring means on the MV grid side in order to obtain the required phase information for the phase synchronization in the premagnetization procedure. Instead, this information is obtained in advance one time only, stored, and used for future premagnetization procedures. If the precharging device is already implemented in circuit in the converter system 3, no additional expense is required to supplement the premagnetization functionality. This is limited to the implementation of control routines for the premagnetization procedure that can be implemented in software and stored in the storage of the controllers 26.

Numerous modifications are possible within the scope of the present invention. For example, the converter system 3 according to the invention can be used for different applications, including for coupling to other grids apart from MV grids, and in conjunction with other devices 4, e.g. different systems for power generation, transmission and distribution. The application for PV systems or wind turbines or with drive devices is particularly advantageous because here the converter system 3 is often switched on and off. The precharging and premagnetization device 18 is largely independent of the type of the converter 11. It is only important that, by suitable control of the converter 11, an output AC voltage of the converter 11 that is suitable for the grid voltage can be generated.

The branch section 52 in the precharging branch 19 of the embodiment of FIG. 2 can be omitted, in particular if the auxiliary transformer 46 has a sufficiently high impedance to limit the precharging current to permissible values. Otherwise, further branch sections with different precharging resistors may be provided to control the precharging current according to what is desired and required.

The precharging and premagnetization device 18 of FIG. 2 comprises both the auxiliary transformer 46 and the precharging transformer 21 so as to be suitable for different systems and rated values. However, depending on the application and requirement, one of the transformers 46, 21 may also be omitted. For example, the precharging transformer 21 may be omitted if the secondary voltage of the auxiliary transformer 46 is sufficient for the functionalities provided here, in particular the precharging and premagnetization procedure. Conversely, the auxiliary transformer 46 could also be omitted if the auxiliary devices 47-49 and the controller 26 are otherwise powered and a low-voltage reference voltage is available in another suitable form for the premagnetization procedure and device 18 according to the invention. The precharging transformer 21 can then provide a possibly required voltage transformation for the precharging.

Alternatively, the DC voltage intermediate circuit 16 could also be precharged by another power source, e.g. by the connected PV system 41, a wind power plant via a converter, a battery, etc. The precharging branch 19 would then be omitted. The device 18 would thus serve only as a premagnetization device to perform the premagnetization procedure before closing the circuit-breaker 8 based on the measured reference voltage $U_{ref}$ and the known fixed relationships between it and the grid voltage.

A premagnetization device is disclosed for a converter system 3 connectable to a three-phase electrical grid 2 that has a three-phase power transformer 9, a converter 11 connected to the power transformer 9 and a circuit-breaker 8 on the grid side of the power transformer 9. The premagnetization device 18 is configured to suitably premagnetize the power transformer 9 in a state isolated from the grid 2. The premagnetization device 18 uses a single-phase reference voltage $U_{ref}$ that has a fixed relationship to the grid voltage $U_{grid}$ with regard to the voltage parameters, in order to generate, based on the measured instantaneous reference voltage $U_{ref}$ and the known fixed parameter relationships, by actuating the converter 11, a three-phase alternating voltage synchronous to the grid voltage $U_{grid}$ on the grid side of the power transformer 9. A converter system 3 and a method for premagnetizing a three-phase power transformer 9 of a converter system 3 are also disclosed.

What is claimed is:

1. A premagnetization device for a converter system that can be connected to a three-phase electrical grid that has a three-phase power transformer with a primary side that can be connected to the three-phase electrical grid and a single-phase auxiliary power supply, and a converter connected to the secondary side of the power transformer and including a DC voltage intermediate circuit at a direct current (DC) side, the premagnetization device comprising:

a single-phase auxiliary transformer having a primary winding on a primary side connected to the single-phase auxiliary power supply which is a phase voltage or a chained voltage of the grid, and a secondary winding on a secondary side thereof connected the direct current (DC) side of the converter connected to the secondary side of the power transformer, and a detection means comprising a measuring means for detecting the voltage on a secondary winding of the auxiliary transformer as a reference for premagnetization of the power transformer, and when the primary side is isolated from the three-phase electrical grid, the premagnetization device is configured to: (i) premagnetize the power transformer via the converter such that a voltage on the primary side of the power transformer is essentially synchronous to a grid voltage (Ugrid) of the grid, wherein the premagnetization device is connected to a single-phase reference voltage (Uref) that has a fixed relationship to the grid voltage (Ugrid) in terms of frequency, amplitude and phase, and the detection means further comprises a means for detecting the reference voltage (Uref), and (ii) premagnetize the power transformer via the converter based on the instantaneous detected reference voltage (Uref) and the known relationships between the reference voltage (Uref) and the grid voltage (Ugrid), and (iii) precharge the DC voltage intermediate circuit at the direct current (DC) side of the converter.

2. The premagnetization device according to claim 1, wherein the reference voltage (Uref) is a voltage derived from the grid voltage (Ugrid).

3. The premagnetization device according to claim 1, comprising a logic for controlling the premagnetization procedure from the DC voltage intermediate circuit of the converter by the actuation of actuatable power semiconductor switches of the converter using the single-phase reference voltage (Uref), wherein the control logic is preferably integrated or integrable into a controller of the converter system.

4. The premagnetization device according to claim 1, comprising logic means for determining the premagnetization of relevant information via relationships between the parameters of the grid voltage (Ugrid) and the single-phase reference voltage (Uref) in a measurement routine, and storage means for storing said determined relevant information for use in subsequent operational premagnetization procedures.

5. The premagnetization device according to claim 4, wherein the storage means comprise the determined relevant information indicating the fixed relationships between the amplitudes and the phase angles of the single-phase reference voltage (Uref) and the three-phase grid voltage (Ugrid) and the phase sequence of the three-phase system of the three-phase electrical grid, and further store measured or predetermined data, including one or more of a turns ratio between the primary and secondary windings of the power transformer, an amplitude ratio and/or phase shift between the primary and secondary voltage of the power transformer when the primary winding of the auxiliary transformer is idle, and a control logic is configured for the premagnetization procedure to calculate actual values of the grid voltage (Ugrid) and the primary voltage of the power transformer during a premagnetization procedure based on the stored relevant information or the measured or predetermined data.

6. The premagnetization device according to claim 1, further comprising a measuring means for detecting the secondary voltage of the power transformer for use in determining the primary voltage of the power transformer in the premagnetization procedure, wherein the premagnetization device is free of measuring means for detecting electrical quantities on the grid side of the power transformer, including the grid side of a circuit-breaker between the three-phase electrical grid and the power transformer.

7. The premagnetization device according to claim 1, wherein the premagnetization device further comprises logic means for performing and controlling a precharging procedure before performing the premagnetization procedure.

8. The premagnetization device according to claim 7, wherein the premagnetization device comprises a precharging branch that connects the single-phase auxiliary transformer to the DC voltage intermediate circuit and has a rectifier device inserted therein, preferably an uncontrolled two-pole bridge rectifier circuit.

9. The premagnetization device according to claim 8, wherein, in the precharging branch between the single-phase auxiliary transformer and the rectifier circuit, a precharging transformer for transforming the secondary voltage of the single-phase auxiliary transformer to a suitable level for operating the converter is connected.

10. A converter system for an electrical power generation, power transmission and/or power distribution system, in particular for a photovoltaic or wind power plant, wherein the converter system comprises:

a three-phase power transformer having a primary side and a secondary side wherein the primary side is connected to a three-phase electrical grid and a single-phase auxiliary power supply;

a converter connected to the secondary side of the power transformer and having a DC voltage intermediate circuit which has at least one DC intermediate circuit capacitor;

a circuit-breaker arranged on the primary side of the power transformer and configured to be selectively closed or opened to connect the primary side of the power transformer and the converter to an electrical grid electrically or isolate it from this grid galvanically; and a premagnetization device according to claim 1.

11. The converter system according to claim 10, wherein an auxiliary transformer of the premagnetization device that provides the reference voltage (Uref) for the premagnetization procedure is directly connected to a single phase of the three-phase electrical grid.

12. A method of premagnetization of a three-phase power transformer of a converter system having a converter that is connected to the secondary side of the power transformer whose primary side is connected to an electrical grid and a single phase auxiliary power supply, the method comprises:

connecting a premagnetization device including a single-phase auxiliary transformer having a primary winding on a primary side to the single-phase auxiliary power supply which is a phase voltage or a chained voltage of the grid, and connecting a secondary winding on a secondary side thereof to a direct current (DC) side of the converter connected to the secondary side of the power transformer;

premagnetizing, via the premagnetization device, the power transformer via the converter such that a voltage on the primary side of the power transformer is synchronous to a grid voltage (Ugrid) of the grid, wherein the premagnetization device is connected to a single-phase reference voltage (Uref) in a fixed relationship to the grid voltage (Ugrid) in terms of frequency, amplitude and phase;

determining reference quantities for a required primary voltage of the power transformer as a function of the reference voltage in a measurement routine, preferably during the startup of the converter system, and storage of the determined electrical reference quantities in a storage;

premagnetizing, via the premagnetization device, the power transformer with the primary side of the power transformer isolated from the grid using the instantaneous measured reference voltage (Uref) and the stored electrical reference quantities by actuating the converter during subsequent startup procedures, before the converter system is connected to the electrical grid; and precharging, via the premagnetization device, a DC voltage intermediate circuit at the direct current (DC) side of the converter.

13. The method according to claim 12, further comprising the precharging of the DC voltage intermediate circuit from the reference voltage (Uref) using a rectifier device and, if necessary, a precharging transformer before performing the premagnetization routine.

14. The method according to claim 12, wherein the measurement routine is performed under essentially the same reduced load conditions as the precharging and/or premagnetization procedure.

* * * * *